United States Patent Office 3,381,015
Patented Apr. 30, 1968

3,381,015
LOWER-CYCLOALKYL AND LOWER-CYCLO-
ALKENYL PYRIDINEACETIC ACID AND
DERIVATIVES
Tsung-Ying Shen and Clifford H. Shunk, Westfield, N.J.,
assignors to Merck & Co., Inc., Rahway, N.J., a corporation of New Jersey
No Drawing. Filed Dec. 30, 1965, Ser. No. 517,843
11 Claims. (Cl. 260—295)

This invention relates to new heterocyclic aliphatic acids, alcohols, and aldehydes and to derivatives thereof and to the processes for preparing the same. More specifically, this invention relates to cyclic substituted hetero acids, esters, and amides and to their corresponding aldehydes, alcohols, ethers, acetals, and non-toxic salts thereof. Still more particularly, it relates to cyclic substituted pyridine and diazine acids and derivatives. Further, this invention relates to compounds with the following formula:

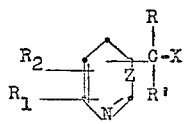

wherein Z is selected from the group consisting of carbon and nitrogen; R is selected from the group consisting of hydrogen and lower alkyl (i.e., methyl, ethyl, butyl, and the like) and when taken together with R′ forms a lower alkylidene; R′ is selected from the group consisting of hydrogen and when taken together with R forms a lower alkylidene; $R_1$ is selected from the group consisting of hydrogen, halogen (i.e., chloro, bromo, and fluoro) and lower alkyl (i.e., methyl, ethyl, butyl, and the like); $R_2$ is selected from the group consisting of cycloalkyl (cyclopentyl, cyclohexyl, and the like), cycloalkenyl (cyclopentenyl, cyclohexenyl, and the like) and substituted cycloalkyl, wherein said substituent is selected from the group consisting of hydroxy, lower alkoxy (methoxy, propoxy, butoxy, and the like) and benzyloxy; and X is selected from the group consisting of —COOH; —$CH_2$COOH; —$COOR_3$; —$CH_2COOR_3$, wherein $R_3$ is selected from the group consisting of lower alkyl, lower alkenyl, lower alkynyl, cyclic lower alkyl, phenyl, lower alkanoylaminophenyl, carboxyphenyl, carboxamidophenyl, lower alkoxy lower alkyl, poly lower alkoxy lower alkyl, poly hydroxy lower alkyl, and di(lower alkyl)-amino lower alkyl;

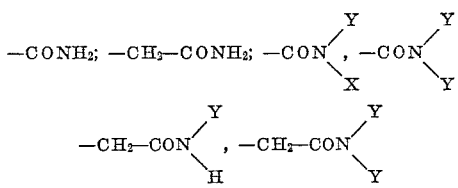

wherein Y is selected from the group consisting of lower alkyl, hydroxy lower alkyl, poly hydroxy lower alkyl, phenyl lower alkyl, phenyl, lower alkoxy phenyl, halogenophenyl, trifluoro-methylphenyl, cyclohexyl, carboxymethyl, 1-carboxyl-3-carbamyl-propyl, N-di(lower alkyl) carboxamidomethyl, N,N-di-(lower alkyl) amino lower alkyl, N-lower alkyl pyrrolidyl, N-lower alkyl pyrrolidyl lower alkyl, and Y forms a heterocyclic group with the nitrogen when Y is selected from the group consisting of —$CH_2$—$CH_2$—O—$CH_2$—$CH_2$—, —$CH_2$—$CH_2$—$\overset{R_4}{N}$—$CH_2$—$CH_2$— wherein $R_4$ is lower alkyl,

—$CH_2$—$CH_2$—NH—$CH_2$—$CH_2$—

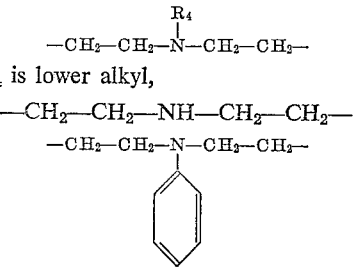

and

—$CH_2$—$CH_2$—$\underset{CH_2-CH_2OH}{N}$—$CH_2$—$CH_2$— and —$CH_2$—$CH_2$—$CH_2$—$CH_2$—$CH_2$—; —$CH_2OH$; —$CH_2$—$CH_2OH$; —$CH_2OR_5$, —$CH_2$—$CH_2OR_5$, wherein $R_5$ is a lower alkyl; —CHO; —$CH_2$—CHO; —$CH(OR_6)_2$, —$CH_2$—$CH(OR_6)_2$, wherein R is a lower alkyl; and the pharmaceutically non-toxic salts of the acids. In the above case wherein the term lower alkoxy, lower alkyl, or lower alkenyl is referred to, a carbon chain of at least 1 to 6 is contemplated.

In its preferred aspects, this invention relates to compounds of the following structural formulae:

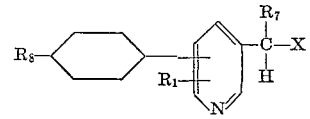

wherein $R_1$ and X are as previously defined; $R_7$ is selected from the group consisting of hydrogen and lower alkyl; $R_8$ is selected from the group consisting of hydrogen, hydroxy, lower alkoxy, and benzyloxy.

In the still more preferred aspects of this invention, the hetero moiety is pyridine, R is lower alkyl or hydrogen, R′ is hydrogen, $R_1$ is hydrogen or lower alkyl, X is COOH, and $R_2$ is cyclohexyl or 4′-hydroxy cyclohexyl, especially cyclohexyl. Representative compounds of this invention are 6-cyclohexyl-3-pyridine acetic acid, 5-cyclohexyl-2-pyridine acetic acid, 6-cyclohexyl-2-pyridine acetic acid, 6-cyclohexyl-4-pyridine acetic acid, 5-cyclohexyl-3-pyridine acetic acid, and the above compounds substituted with methyl or chloro in the pyridine moiety.

We have found that the compounds described above have anti-inflammatory activity and are effective in the prevention and inhibition of granuloma tissue formation. In addition, some of them are of value in the treatment of arthritic and dermatological disorders and in like conditions which are responsive to treatment with anti-inflammatory agents. In addition, the compounds of this invention have a useful degree of antipyretic and analgesic activity. For the above purposes they are normally administered orally in tablets or capsules, the optimum dosage depending on the particular compound being used and the type and severity of the condition being treated. Although the optimum quantities of these compounds to be used will depend on the compound employed and the particular type of disease condition treated, oral dose levels of preferred compounds in the range of 1–2000 mg. per day are useful in control of arthritic conditions, depending on the activity of the specific compound and the reaction sensitivity of the patient.

The compounds of this invention may be prepared from the starting materials indicated below. Many of these compounds are known, others are prepared by procedures well known in the art.

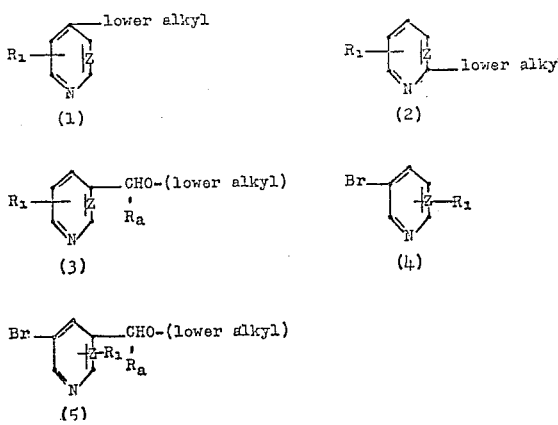

Equivalents: $R_a$ is hydrogen or lower alkyl (such as methyl, ethyl, butyl, and the like) and $R_1$ and Z are as previously defined.

Starting materials 3 and 5 may be prepared from their corresponding pyridine carboxylic acids. For example, pyridine-3-carboxylic acid or 5-bromo-pyridine-3-carboxylic acid may be converted to the corresponding methyl ester by well-known means (i.e., reaction with methanol in the presence of HCl), followed by reduction to the corresponding hydroxymethyl compound by well-known means (i.e., reduction with $LiAlH_4$). The hydroxymethyl compound may then be converted to the chloromethyl compound by reaction with thionyl chloride, and subsequent reaction with a sodium lower alkoxide (i.e., $NaOCH_3$), to form the desired 3-alkoxymethyl pyridine starting material. Alternatively, when the starting material is to contain an $R_a$ (as a lower alkyl), the pyridine-3-carboxylic acid compound is converted to the corresponding acid chloride (i.e., reaction with thionyl chloride) followed by reaction of the acid chloride with a di(lower alkyl)cadmium, preferably dimethyl cadmium (preparation of this compound is known in the art) at room temperature in an inert solvent (i.e., ether), addition of $H_2O$ and extraction with ether to isolate the pyridine-3-methylketone compound. This ketone compound is then reduced to the corresponding sec-alcohol with $LiAlH_4$. The remaining reactions are similar to those described above for the hydroxymethyl compound.

In the preferred embodiment of this invention, the starting materials are those in which Z is carbon (i.e., pyridine moiety); in structural formulae 1 and 2, $R_1$ is as previously defined, but when $R_1$ is lower alkyl, it is attached to the 3- or 5-position of the pyridyl moiety; in structural formulae 3 and 4, $R_1$ is as previously defined and on the 5-position of the pyridyl moiety; and in structural formula 5, $R_1$ is hydrogen.

Starting material 1 is used to prepare the 6-cyclic-4-(pyridine or diazine)aliphatic acid compounds. Starting material 2 is used to prepare the 6-cyclic-2-(pyridine or diazine)aliphatic acid compounds, and in the 4-cyclic-2-(pyridine or diazine)aliphatic acid compounds. The term cyclic refers to and hereinbelow will refer to the $R_2$ group previously mentioned. For example, the process for preparing these compounds may be described as follows: 4-picoline is reacted with cyclohexanone in the presence of aluminum and mercuric chloride (condensation reaction) followed by dehydration of the product with sulfuric acid to yield 2-(1'-cyclohexenyl)-4-methyl pyridine. Hydrogenation of this compound is followed by metalation with phenyl lithium or any other well-known means used to form an organo metal compound, and the reaction of the organo metal compound thus produced with carbon dioxide (well-known carbonation reaction) yields 6-cyclohexyl pyridine-4-acetic acid. Similarly, using 2-picoline as the starting material will yield 6-cyclohexyl pyridine-2-acetic acid, as well as the 4-cyclohexyl pyridine-2-acetic acid. Alternatively, if in each of the above cases the starting material is a lower alkyl pyridine rather than picoline, the final compound will be the corresponding α-lower alkyl acetic acid compound (i.e., using 2-ethyl pyridine will yield α-methyl-(6-cyclohexylpyridine)-2-acetic acid). When the propionic acid compound rather than the acetic acid compound is desired, one may employ any well-known procedure for increasing the carbon chain. For example, any one of the acetic acid compounds thus prepared is esterified to the corresponding ester (i.e., reaction with diazomethane). The ester is reduced to the corresponding alcohol (i.e. using lithium aluminum hydride), the alcohol converted to the corresponding chloride (i.e., reaction with thionyl chloride), the chloride converted to the corresponding nitrile (i.e., reaction with sodium cyanide in ethanol), and the nitrile hydrolyzed to the desired propionic acid compound (i.e., reaction with an aqueous mineral acid).

When it is desired to obtain the (3'-cyclohexenyl) aliphatic acid final compound, 4-benzyloxycyclohexanone is used in the above-mentioned condensation reaction. This benzyloxy function is then reduced to the corresponding 4'-hydroxy in the hydrogenation step. At this stage of the synthesis, the 4'-hydroxycyclohexyl function is dehydrated (i.e., $H_2SO_4$) to the 3'-cyclohexenyl. From this point the remaining portion of the synthesis is the same. Alternatively, if the 4'-hydroxycyclohexyl function is desired, 4-benzyloxycyclohexanone is used in the condensation and the hydrogenation is carried out with a platinum catalyst so that the benzyloxy function is not reduced. After the aliphatic side chain is prepared, the 4'-benzyloxy function is reduced to form the desired 4'-hydroxy function. Further, if the 4'-lower alkoxycyclohexyl function is desired, the condensation is carried out with a 4-lower alkoxy cyclohexanone, with the other reaction steps remaining the same.

Starting material 3 above is used to prepare the 6-cyclic-3-(pyridine or diazine) aliphatic acid compounds. For example, 3-methoxymethyl-5-methylpyridine is condensed with cyclohexanone, dehydrated and later hydrogenated, as described for 4-picoline above, to form 6-cyclohexyl-3-methoxymethyl-5-methylpyridine. This compound is then dealkylated to its corresponding hydroxymethyl compound by reaction with hydrochloric acid in the presence of acetic acid. The corresponding chloromethyl compound is then prepared by a replacement reaction using thionyl chloride. The chloromethyl compound is then converted to the corresponding cyanomethyl compound (i.e., with sodium cyanide) and subsequently hydrolyzed by any well-known means, to the desired 6-cyclohexyl-5-methylpyridine-3-acetic acid. When the α-lower alkyl-6-cyclic-3-(pyridine or diazine) acetic acid compound is desired, starting material 3 above is used, wherein $R_a$ is lower alkyl. For example, when 3-(α-methoxyethyl)-5-methylpyridine is used as the starting material in place of 3-methoxymethyl-5-methylpyridine as shown above and the same steps carried out, the desired α-methyl-(6-cyclohexyl-5-methylpyridine)-3-acetic acid is produced. When the higher aliphatic acid compounds are desired (i.e., propionic), the acetic acid carbon chain is increased in a manner similar to that indicated for the compounds prepared from starting materials 1 and 2.

Starting material 4 is used to prepare the 5-cyclic-2-(pyridine or diazine) aliphatic acid compounds. For example, 3-bromopyridine may be condensed with cyclohexanone in the presence of butyl lithium and subsequently dehydrated and reduced as previously mentioned to form the 3-cyclohexylpyridine. This compound may then be reacted with a lower alkyl iodide to yield a lower alkyl-3-cyclo-hexylpyridinium iodide. This compound is then heated, poured into water, and the mixture made alkaline. The 3-cyclohexyl-2-lower alkylpyridine is then extracted with ether. The desired 3-cyclohexyl-2-pyridine acetic acid or α-lower alkyl-3-cyclohexyl-2-pyridine acetic acid final compound is then prepared according to the procedure used for starting materials 1 and 2. Similarly, the 4'-hydroxy-cyclohexyl, 4'-benzyloxycyclohexyl, 4'-lower alkoxycyclohexyl, or 3'-cyclohexenyl compounds are also prepared in accordance with the procedures for starting materials 1 and 2.

Starting material 5 is used to prepare the 5-cyclic-(pyridine or diazine)-3-aliphatic acids. The starting material is condensed according to the procedure for starting material 4, and the remaining reactions carried out according to the procedure for starting material 3.

The ester, amide, aldehyde, alcohol, acetal, and ether compounds of this invention may be prepared from any of the corresponding acids by procedures well known in the art. For example, the process for the preparation of the esters may be carried out by reaction of the corresponding acid with a strong acid, such as hydrochloric acid, sulfuric acid, toluenesulfonic acid, p-nitrotoluenesulfonic acid, benzenesulfonic acid, and the like (preferably 1–3% concentrated sulfuric acid), and with the appropriate alcohol. The alcohol may be used as a solvent also or an inert solvent, such as tetrahydrofuran, ether, or dioxane, may be used. The reaction may be carried out at any suitable temperature; however, it is preferably carried out at or near the reflux temperature of the system. When the alcohol is not suitable for use as a solvent, inert solvents are used along with the alcohol. When using phenol as the alcohol for the esterification step, it is highly preferred to azeotrope the water formed so as to allow ester formation. Another highly suitable procedure for this esterification step is the reaction of the acid with at least one mole of a diimide (such as dicyclohexylcarbodiimide) and the appropriate alcohol in an inert solvent, such as tetrahydrofuran.

The process for the preparation of the amido compounds of this invention may be carried out by preparing the acid halide, such as reacting the corresponding acid with thionyl chloride, thionyl bromide, phosphorus oxychloride, phosphorus oxybromide, phosphorus pentachloride, or phosphorus pentabromide in an inert solvent—such as ether, benzene, toluene, xylene, tetrahydrofuran, dioxane, and the like—followed by reaction of the acid halide with an excess of the desired amine at any suitable temperature (0° C. to room temperature preferred) or reaction with dicyclohexylcarbodiimide and an excess of the amine at any suitable temperature until the reaction is substantially complete. When primary amides are desired, ammonia may be employed; when secondary amides are required, primary aliphatic or aromatic amines are employed—such as propylamine, benzylamine, β-phenethylamine, aniline, and the like. To obtain cyclic amides, N-unsubstituted cyclic amines—such as pyrrolidine, piperidine, morpholine, and the like—are employed. It is generally preferred to run this reaction with the amine acting as the solvent also; however, when this cannot be conveniently done, an inert solvent such as indicated above may be used. In addition, it is preferred to remove the excess reagent and acidic by-product formed in this reaction prior to the addition of the amine. However, the acid may be neutralized by using an excess of the amine. An alternative procedure is to react the acid compound with dicyclohexylcarbodiimide and the desired amine. The three components may be mixed at any suitable temperature (−10° C. to 50° C.), but are preferably mixed at ambient temperatures for several hours.

The process for the preparation of the aldehyde compounds of this invention may be carried out by preparing the acid halide, such as reacting the corresponding acid compounds with a compound such as thionyl chloride, thionyl bromide, phosphorus pentachloride, phosphorus pentabromide, phosphorus oxychloride, phosphorus oxybromide, and the like, but preferably thionyl chloride in an inert solvent, and subsequent reduction of the acid halide to the aldehyde. The inert solvents used may be benzene, toluene, xylene, ethers (diethyl ether, dioxane) tetrahydrofuran, or the like, preferably benzene or toluene. Any suitable temperature may be employed (room temperature to reflux); however, it is preferred to use temperatures at or near the reflux temperature of the system until the formation of the acid halide is substantially complete. The acid halide is then reacted with a Rosenmund catalyst such as 5% Pd on $BaSO_4$ with quinoline, or with a tritertiarybutoxy alkali or alkali earth aluminum hydride, such as potassium, sodium, or lithium aluminum hydride and the like. The reduction is preferably carried out with a tritertiarybutoxy alkali or alkali earth aluminum hydride, particularly with tritertiarybutoxy lithium aluminum hydride in tetrahydrofuran or ether. However, the inert solvent may also be benzene, toluene, xylene, ethers (diethyl ether, dioxane), and the like. The reaction may be carried out at any suitable temperature (−80° C. to room temperature), but preferably −35° C. to −15° C. until the reaction is substantially complete.

It is preferred to remove the inorganic acid formed after the acid halide preparation; otherwise, the inorganic acid would preferentially consume the subsequent addition of the hydride. However, if it is desired, the inorganic acid may remain if an excess of the hydride is used to react with the inorganic acid as well as with the acid halide. When the butoxide reagent is used, it is preferred to use temperatures below 0° C. If temperatures above 0° C. are used, the reduction will lead to the corresponding alcohol instead of the aldehyde. As indicated, although higher temperatures may be used, it is not economically feasible, for a reaction temperature will be reached wherein the corresponding alcohol will be almost exclusively produced. However, if the alcohol is desired, this is still another way of going directly from the acid to the alcohol.

The process for the preparation of the acetal compounds of this invention may be carried out by reacting the previously prepared aldehyde compound with a lower alkanol in the presence of a strong acid. Examples of strong acids contemplated for this reaction are toluenesulfonic acid, p-nitrobenzenesulfonic acid, and mineral acids (hydrochloric acid, sulfuric acid, and borontrifluoride). It is preferred to use a catalytic amount of toluenesulfonic acid or concentrated hydrochloric acid in a lower alkanol (methanol, ethanol, butanol, and the like) at any suitable temperature. However, the solvents used may be aromatic compounds or combinations of the alcohol and ethers as well as the alcohol itself. The reaction temperature is not critical; and, therefore, temperatures from 0° C. to reflux may easily be used, although ambient temperatures are preferred. The quantity of acid is not critical; all that is required is that the acid be of sufficient strength to catalyze the reaction. Alternatively, the reaction may be carried out by employing the aldehyde and the appropriate lower alkyl orthoformate. When it is desired to isolate the acetal and water which is to be used in the isolation, the reaction mixture must be neutralized with a base such as sodium carbonate so as to prevent the hydrolysis of the acetal back to the aldehyde.

The alcohols of this invention may be obtained by reaction of the corresponding acid compound with an alkali or alkali earth aluminum hydride. Almost any solvent may be used as long as it is inert to the hydride, and the reactants have some degree of solubility in it. Preferred inert solvents are tetrahydrofuran and diethyl ether. The temperature of this reaction is not critical; therefore, under these conditions, temperatures from −15° C. to reflux are well within the contemplation of this invention. The complex metal hydride—such as lithium aluminum hydride, and the like—used may be less than the theoretical amount; however, it is preferred to use 200–400% excess of the preferred lithium aluminum hydride. After the reaction, the excess hydride is decomposed by addition of ethyl acetate or an active hydrogen reactant, such as alcohols, water, or dilute aqueous mineral acids. The alcohol compound obtained from this reaction is in the form of its salt, and therefore an aqueous acid is used to convert the alcohol salt to the free alcohol. Such acids may be hydrochloric, ammonium chloride, sulfuric, and the like. This portion of the reaction is preferably carried out at 0° to ambient temperatures by first adding water followed by dilute sulfuric acid. The ester may also be reduced catalytically using such catalysts as copper chromite.

The ether compounds of this invention are prepared from the corresponding alcohols. The alcohol is reacted with a strongly basic condensing agent, such as sodium hydride, potassium hydride, potassium tertiary butoxide, or sodamide, and a lower alkyl halide (methyl iodide, allyl chloride, β-phenethyl bromide, ethyl bromide, and the like), preferably sodium hydride and 50% excess of methyl iodide. Although dimethylformamide is generally used as the solvent, any non-active hydrogen solvent may be used, such as aromatic solvents (benzene, toluene), ethers (diethyl ether, dioxane, tetrahydrofuran), and the like. The reaction is generally carried out at ambient temperatures; however, temperatures from 0–50° C. may be conveniently used also. The quantity of reagents used will affect the yield of the ether; therefore, it is generally preferred to use an excess of the hydride and halide. Additionally, the excess hydride is used to consume any active hydrogen materials which may be present in the starting alcohol compound.

The non-toxic salts of the acid compounds of this invention may be conveniently prepared by procedures well known in the art. For example, the acid compound may be reacted with an inorganic base in an inert solvent and the solution evaporated to yield the desired salt.

The following examples are given by way of illustration:

Example 1.—2-cyclohexyl-5-methoxymethylpyridine (A) 2 - (1'-hydroxycyclohexyl)-5-methoxymethylpyridine.—To a mixture of mercuric chloride (1 g.) and aluminum turnings (15 g.) which is heated for 15 minutes at 120°, is added 0.2 mol. of 3-methoxymethylpyridine and 0.2 mol. of cyclohexanone. This mixture is stirred and after reaction begins, 0.8 mol. of 3-methoxymethylpyridine is added in one portion and 0.8 mol. of cyclohexanone is added dropwise over 1.5 hours. The mixture is cooled and decanted into 1 l. of 6 N sodium hydroxide, and extracted with benzene. The benzene solution is extracted with 2×500 ml. of 6 N hydrochloric acid. The aqueous extract is made alkaline with sodium hydroxide and extracted with benzene. The benzene solution is dried over sodium hydroxide pellets, filtered, and concentrated. The residue on distillation under reduced pressure yields 2 - (1' - hydroxycyclohexyl)-5-methoxymethyl pyridine.

(B) 2 - (1' - cyclohexen-1'-yl)-5-methoxymethylpyridine.—One mol. of 2 - (1' - hydroxycyclohexyl)-5-methoxymethylpyridine is added slowly with stirring and cooling to 400 g. of sulfuric acid maintained below 60°. After 15 minutes the mixture is poured onto crushed ice, made alkaline with sodium hydroxide, and extracted with ether. The ether solution is dried over magnesium sulfate, filtered, and concentrated. Distillation of the residue yields 2 - (1' - cyclohexen - 1' - yl) - 5 - methoxymethylpyridine.

(C) 2 - cyclohexyl - 5 - methoxymethylpyridine.—5 mol. of 2 - (1' - cyclohexen - 1' - yl) - 5 - methoxymethylpyridine is dissolved in ethanol and reduced over platinum. The catalyst is removed and the filtrate concentrated giving 2-cyclohexyl-5-methoxymethylpyridine.

When 2 - picoline, 4 - picoline, 2 - ethylpyridine, 4 - ethylpyridine, 2,3 - dimethylpyridine, 4 - chloro - 2 - methylpyridine, 5 - chloro - 4 - methylpyridine, 5-bromo-2 - ethylpyridine, 3 - methoxymethyl - 5 - methylpyridine, 5 - chloro - 3 - methoxymethylpyridine, and 3 - (α-methoxyethyl) - pyridine are used in place of 3 - methoxymethylpyridine in the above example, there are obtained 6 - cyclohexyl - 2 - methylpyridine, 4 - cyclohexyl - 2 - methylpyridine, 6 - cyclohexyl - 4 - methylpyridine, 6 - cyclohexyl - 2 - ethylpyridine, 4 - cyclohexyl - 2 - ethylpyridine, 6 - cyclohexyl - 4 - ethylpyridine, 6 - cyclohexyl - 2,3 - dimethylpyridine, 4 - cyclohexyl - 2,3 - dimethylpyridine, 4 - chloro - 6 - cyclohexyl - 2 - methylpyridine, 5 - chloro - 6 - cyclohexyl - 4 - methylpyridine, 5 - bromo - 6 - cyclohexyl - 2 - ethylpyridine, 5 - bromo-4 - cyclohexyl - 2 - ethylpyridine, 6 - cyclohexyl - 3 - methoxymethyl - 5 - methylpyridine, 5 - chloro - 6 - cyclohexyl - 3 - methoxymethylpyridine, and 6 - cyclohexyl - 3 - (α-methoxyethyl)-pyridine.

Example 2.—3-cyclohexylpyridine (A) 3 - (1' - cyclohexenyl)pyridine.—N-butyl lithium is prepared from 4.4 grams of lithium and 40 g. of 1-bromobutane in 300 ml. of dry ether. The mixture is cooled in a Dry Ice-acetone bath and to it is added 30 g. of 3-bromopyridine and 28.6 g. of cyclohexanone. After 3 hours the reaction mixture is warmed to room temperature, poured into ice water and distilled to yield 3-(1'-cyclohexenyl)pyridine, B.P. 266–268° C.

(B) 3-cyclohexylpyridine.—The compound of part A is reacted in accordance with the procedure of Example 1C to yield 3-cyclohexylpyridine.

When 3-bromo-5-chloropyridine, 3-bromo-5 - methylpyridine, 3-bromo-5-(α-methoxyethyl) - pyridine, and 3-bromo-5-methoxymethylpyridine are used in the above example in place of 3-bromopyridine, there are obtained the corresponding 5-chloro-3 - cyclohexylpyridine, 3 - cyclohexyl-5-methylpyridine, 3-cyclohexyl - 5 - (α - methoxyethyl)-pyridine, and 3 - cyclohexyl - 5 - methoxymethylpyridine.

Example 3.—2-cyclohexyl-5-hydroxymethylpyridine hydrochloride 2-cyclohexyl-5-methoxymethylpyridine (1 mol.) is dissolved in 2 l. of acetic acid and 500 ml. of hydrochloric acid and the solution is refluxed overnight. The solution is concentrated under reduced pressure, water added, and the solution made basic with sodium hydroxide. This mixture is extracted with ether and the ether solution dried over magnesium sulfate, filtered, and concentrated. Distillation of the residue under reduced pressure yields 2-cyclohexyl-5-hydroxymethylpyridine. This is dissolved in ether, and dry hydrogen chloride is bubbled in yielding 2-cyclohexyl-5-hydroxymethylpyridine hydrochloride.

When 6-cyclohexyl-3-methoxymethyl-5-methylpyridine, 5-chloro-6-cyclohexyl - 3 - methoxymethylpyridine, and 6-cyclohexyl - 3 -(α - methoxyethyl) - pyridine obtained from Example 1 and 3-cyclohexyl-5-(α-methoxyethyl)-pyridine and 3-cyclohexyl-5-methoxymethylpyridine obtained from Example 2 are used in place of 2-cyclohexyl-5-methoxymethylpyridine in the above example, there are obtained 6-cyclohexyl-3-hydroxymethyl - 5 - methylpyridine, 5-chloro-6-cyclohexyl - 3 - hydroxymethylpyridine, 6-cyclohexyl-3-(α - hydroxyethyl) - pyridine, 3 - cyclohexyl-5-(α-hydroxyethyl) - pyridine, and 3 - cyclohexyl-5-hydroxymethylpyridine.

Example 4.—2-cyclohexyl-5-chloromethylpyridine hydrochloride 2-cyclohexyl-5 - hydroxymethylpyridine hydrochloride (1 mol.) is added in portions to 600 g. of thionyl chloride with stirring and cooling. The resulting solution is refluxed for 2 hours, cooled, and concentrated under reduced pressure giving 2-cyclohexyl-5-chloromethylpyridine hydrochloride.

When 6-cyclohexyl-3-hydroxymethyl-5-methylpyridine, 5-chloro-6-cyclohexyl-3 - hydroxymethylpyridine, 6 - cyclohexyl-3-(α-hydroxyethyl) - pyridine, 3 - cyclohexyl - 5-(α-hydroxyethyl)-pyridine, and 3-cyclohexyl - 5 - hydroxymethylpyridine are used in place of 2-cyclohexyl-5-hydromethylpyridine in the above example, there are obtained 6-cyclohexyl-3-chloromethyl - 5 - methylpyridine, 5-chloro-6-cyclohexyl-3-chloromethylpyridine, 6 - cyclohexyl - 3 - (α - chloroethyl) - pyridine, 3 - cyclohexyl - 5-(α-chloroethyl)-pyridine, and 3-cyclohexyl - 5 - chloromethylpyridine.

Example 5.—2-cyclohexyl-5-cyanomethylpyridine

A solution of 1.0 mol. of potassium cyanide and 0.4 mol. of 2-cyclohexyl-5-chloromethylpyridine hydrochloride in a mixture of methanol (1 l.) and water (0.4 l.) is refluxed for one hour. The reaction mixture is diluted with water (1 l.), saturated with sodium carbonate, and extracted wtih ether. The ether extracts are dried over potassium carbonate, filtered, and concentrated. The residue is distilled under reduced pressure given 2-cyclohexyl-5-cyanomethylpyridine.

When 6-cyclohexyl-3-chloromethyl-5-methylpyridine, 5-chloro-6-cyclohexyl-3 - chloromethylpyridine, 6 - cyclohexyl-3-(α-chloroethyl) - pyridine, 3 - cyclohexyl - 5 - (α-chloroethyl)-pyridine, and 3 - cyclohexyl - 5 - chloromethylpyridine are used in place of 2-cyclohexyl-5-chloromethylpyridine in the above example, there are obtained 6-cyclohexyl - 3 - cyanomethyl - 5 - methylpyridine, 5-chloro-6-cyclohexyl - 3 - cyanomethylpyridine, 6 - cyclohexyl-3-(α-cyanoethyl) - pyridine, 3 - cyclohexyl - 5 - (α-cyanoethyl) - pyridine, and 3-cyclohexyl-5-cyanomethylpyridine.

Example 6.—(6-cyclohexyl-3-pyridine)acetic acid 6-cyclohexyl-3-cyanomethylpyridine (1 mol.) is added to 2 l. of aqueous 20% sodium hydroxide. The mixture is refluxed with vigorous stirring for two days. After cooling, the mixture is extracted with ether. The aqueous solution is neutralized to pH 7 with hydrochloric acid and extracted with chloroform. The chloroform solution is dried over sodium sulfate, filtered, and concentrated yielding (6-cyclohexyl-3-pyridine)acetic acid.

When 6-cyclohexyl-3-cyanomethyl-5 - methylpyridine, 5-chloro-6-cyclohexyl-3-cyanomethylpyridine, 6 - cyclohexyl-3-(α-cyanoethyl) - pyridine, 3 - cyclohexyl - 5 - (α-cyanoethyl)- pyridine, and 3-cyclohexyl-5 - cyanomethylpyridine are used in place of 2-cyclohexyl-5-cyanomethylpyridine in the above example, there are obtained 6-cyclohexyl-5-methyl-3-pyridine acetic acid, 5-chloro - 6 - cyclohexyl - 3 - pyridine acetic acid, α - methyl - (6 - cyclohexyl-3-pyridine)acetic acid, α - methyl - (3 - cyclohexyl-5-pyridine)acetic acid, and (3-cyclohexyl - 5 - pyridine) acetic acid, respectively.

Example 7.—5-cyclohexyl-2-methylpyridine

To 3-cyclohexylpyridine (1 mol.) in 1 l. of ether is added 1.5 mol. of methyl iodide dropwise with stirring and cooling. After stirring overnight the ether and excess methyl iodide is removed under reduced pressure giving methyl 3-cyclohexylpyridinium iodide. This product is heated at 300° in a sealed bomb for 3 hours. The resulting mixture is poured into water and the solution is made alkaline with sodium hydroxide. This is then extracted with ether and the ether solution dried over magnesium sulfate, filtered, and concentrated. Distillation of the residue yields 2-methyl-5-cyclohexylpyridine.

When ethyl iodide is used in place of methyl iodide in the above example, there is obtained 5-cyclohexyl-2-ethylpyridine.

When 5-chloro-3-cyclohexylpyridine and 3-cyclohexyl-5-methylpyridine obtained from Example 2 are used in the above example in place of 3-cyclohexylpyridine, there are obtained 5-chloro-3-cyclohexyl-6-methylpyridine and 3-cyclohexyl-5,6-dimethylpyridine.

Example 8.—5-cyclohexylpyridine-2-acetic acid

To 2-methyl-5-cyclohexylpyridine (1 mol.) in 2 l. of octane is added one mol. of phenyl lithium. After the lithium salt has formed, carbon dioxide is passed into the mixture until it is saturated. The mixture is then extracted with dilute sodium hydroxide solution. The sodium hydroxide solution is acidified and concentrated in vacuo to yield 5-cyclohexylpyridine-2-acetic acid.

When 6-cyclohexyl-2-methylpyridine, 4-cyclohexyl-2-methylpyridine, 6-cyclohexyl-4-methylpyridine, 6-cyclohexyl-2-ethylpyridine, 4-cyclohexyl-2-ethylpyridine, 6-cyclohexyl - 4 - ethylpyridine, 4 - cyclohexyl - 2,3 - dimethylpyridine, 4-chloro-6-cyclohexyl-2-methylpyridine, 5-chloro-6-cyclohexyl-4-methylpyridine, 5-bromo-6-cyclohexyl-2-ethylpyridine, and 5-bromo-4-cyclohexyl-2-ethylpyridine obtained from Example 1 and 5-cyclohexyl-2-methylpyridine, 5-cyclohexyl-2-ethylpyridine, 5-chloro-3-cyclohexyl-6-methylpyridine, and 3-cyclohexyl-5,6-dimethylpyridine obtained from Example 7 are used in place of 2-methyl-5-cyclohexyl in the above example, there are obtained (6-cyclohexyl-2-pyridine) acetic acid, (4-cyclohexyl-2-pyridine)acetic acid, (6-cyclohexyl-4-pyridine)acetic acid, α-methyl-(6-cyclohexyl-2-pyridine)acetic acid, α-methyl-(6-cyclohexyl-4-pyridine)acetic acid, (6-cyclohexyl-3-(4-cyclohexyl-2-pyridine)acetic acid, α-methyl-(6-cyclohexyl-4-pyridine)acetic acid, (6-cyclohexyl-3-methyl-2-pyridine)acetic acid, (4-cyclohexyl-3-methyl-2-pyridine)-acetic acid, (4-chloro-6-cyclohexyl-2-pyridine)acetic acid, (5-chloro-6-cyclohexyl-4-pyridine)acetic acid, α-methyl-(5-bromo-6-cyclohexyl-2-pyridine)acetic acid, α-methyl-(5-bromo-4-cyclohexyl-2-pyridine)acetic acid, (5-cyclohexyl-2-pyridine)acetic acid, α-methyl-(5-cyclohexyl-2-pyridine)acetic acid, (5-chloro-3-cyclohexyl-6-pyridine)-acetic acid, and (3-cyclohexyl-5-methyl-6-pyridine)acetic acid, respectively.

Example 9.—Sodium (6-cyclohexyl-3-pyridine)acetate

A solution of .01 mole of sodium hydroxide in 15 ml. of water is added with stirring to a solution of .01 mole of (6-cyclohexyl-3-pyridine) acetic acid in 25 ml. of methanol. Additional methanol is added as needed to maintain complete solution, and the solution is stirred for 1 hour. The reaction mixture is then concentrated in vacuo to obtain sodium (6-cyclohexyl-3-pyridine)acetate.

When the pyridine acetic acids obtained from Examples 6 and 8 are used in place of (6-cyclohexyl-3-pyridine)-acetic acid in the above example, there are obtained the corresponding sodium salts.

Example 10.—β-(6-cyclohexyl-3-pyridine)ethanol

To a well-stirred suspension of .01 mole of lithium aluminum hydride in 50 ml. of anhydrous ether is added dropwise a solution of .01 mole of (6-cyclohexyl-3-pyridine)acetic acid with ice-cooling. The reaction mixture is stirred at room temperature for 1 hour, after which 1 ml. of methanol followed by 10 ml. of water is added dropwise with ice-cooling. This reaction mixture is poured into dilute sulfuric acid. The layers are separated, the aqueous layer is made slightly alkaline with dilute sodium hydroxide and is extracted well with 25 ml. of chloroform. The chloroform extract is washed with water, then dried over sodium sulfate and concentrated in vacuo to yield a residue of β-(6-cyclohexyl-3-pyridine)ethanol.

When the pyridine acetic acid compounds obtained from Examples 6 and 8 are used in place of (6-cyclohexyl-3-pyridine) acetic acid in the above example, there are obtained the corresponding alcohols.

Example 11.—6-cyclohexyl-3-(β-methoxyethyl)pyridine

To a well-stirred suspension of .01 mole of sodium hydride in 25 ml. of dry dimethylformamide which has been cooled to 50 C. is added a solution of .01 mole of β-(6-cyclohexyl-3-pyridine)ethanol in 10 ml. of dimethylformamide. The reaction mixture is stirred for 15 minutes, whereupon .015 mole of methyl iodide is added dropwise and the mixture allowed to stir overnight at room temperature. Water (200 ml.) is added and the resulting mixture extracted well with chloroform. The chloroform extract is then washed with water, dried over sodium sulfate, and concentrated in vacuo to yield 6-cyclohexyl-3-(β-methoxyethyl)pyridine.

When ethyl iodide, allyl bromide, benzyl chloride, and ethoxyethyl chloride are used in place of methyl iodide in the above example, there are obtained the corresponding ethoxy, allyloxy, benzyloxy, and ethoxyethoxy ethyl compounds.

When the alcohol compounds obtained from Example 10 are used in place of β-(6-cyclohexyl-3-pyridine)ethanol in the above example, there are obtained the corresponding ethers.

Example 12.—6-cyclohexyl-3-pyridineacetaldehyde (A) (6-cyclohexyl-3-pyridine)acetyl chloride.—To a solution of .01 mole of (6-cyclohexyl-3-pyridine)acetic acid in 50 ml. of benzene is added .11 mole of thionyl chloride. The reaction mixture is then heated on a steam bath for 1 hour and concentrated in vacuo to remove the solvent and any excess thionyl chloride.

(B) (6 - cyclohexyl - 2 - pyridine)acetaldehyde.—To a suspension of .01 mole of lithium tritertiarybutoxy aluminum hydroxide in 50 ml. of dry tetrahydrofuran at −10° C. is added dropwise with stirring a solution of .01 mole of (6-cyclohexyl-3-pyridine)acetyl chloride in 25 ml. of dry tetrahydrofuran. The reaction mixture is then stirred at −10° C. for 3 hours, followed by the addition of 200 ml. of 5% sulfuric acid, made slightly alkaline with ammonia and the resulting mixture extracted well with (2×500 ml.) chloroform. The combined chloroform extracts are washed with water, dried over sodium sulfate, and concentrated in vacuo to yield crude (6-cyclohexyl-3-pyridine)acetaldehyde.

When the pyridine acetic acid compounds obtained from Examples 6 and 8 are used in place of (6-cyclohexyl-3-pyridine)acetic acid in the above example, there are obtained the corresponding aldehydes.

Example 13.—(6-cyclohexyl-3-pyridine)acetaldehyde dimethylacetal

To a solution of .01 mole of (6-cyclohexyl-3-pyridine)-acetaldehyde in 100 ml. of anhydrous methanol is added .011 mole of p-toluenesulfonic acid. The reaction mixture is stirred at room temperature for 2 days. A solution of sodium methoxide in methanol is added until the solution is just alkaline to moistened litmus paper. The methanol is removed in vacuo and the residue taken up in ether and washed well with water. The ether solution is dried over sodium sulfate and concentrated in vacuo to yield a residue of (6-cyclohexyl-3-pyridine)acetaldehyde dimethylacetal.

When ethanol, n-propanol, and n-butanol are used in place of methanol, there are obtained the corresponding diethyl, dipropyl, and dibutyl acetals.

When the aldehyde compounds obtained from Example 13 are used in place of (6-cyclohexyl-3-pyridine)acetaldehyde in the above example, there are obtained the corresponding dimethylacetal compounds.

Example 14.—(6-cyclohexyl-3-pyridine)acetamide (6-cyclohexyl-3-pyridine)acetic acid (.05 mole) is slowly treated with 0.2 mole of thionyl chloride. The resulting mixture is heated on a steam bath for 2 hours and the excess thionyl chloride is removed in vacuo. To this residue is added 40 ml. of 1,2-dimethoxyethane and the reaction mixture is then added dropwise to 100 ml. of stirred ammonium hydroxide solution (approximately 30%) with ice-cooling. The (6-cyclohexyl-3-pyridine)acetamide is collected, washed with water, and dried in vacuo.

When methylamine, ethanolamine, propylamine, 2,3-dihydroxybutylamine, benzylamine, aniline, o-methoxyaniline, p-ethoxyaniline, m-trifluoromethylaniline, cyclohexylamine, carbobenzyloxymethylamine, carboxymethylamine, glutamine, aminomethyl pyrrolidine, 3-aminomethyl-1-ethylpyrrolidine, morpholine, piperazine, piperidine, and pyrrolidine are used in the above example in place of ammonium hydroxide, there are obtained the corresponding substituted amides.

When the pyridine acetic acid compounds obtained from Examples 6 and 8 are used in place of (6-cyclohexyl-3-pyridine)acetic acid in the above examples, there are obtained the corresponding amides.

Example 15.—Methyl (6-cyclohexyl-3-pyridine)acetate

A mixture of .01 mole of (6-cyclohexyl-3-pyridine)-acetic acid in a solution of 6.0 g. of concentrated sulfuric acid in 250 ml. of anhydrous methanol (approximately 3% sulfuric acid) is stirred at room temperature overnight. The solution is then concentrated in vacuo to approximately one-third the volume, 80 ml. of water is added, the solution is made alkaline with potassium bicarbonate solution and the mixture extracted with (3×50 ml.) chloroform. The combined extracts are washed with saturated potassium bicarbonate solution and water. The ether solution is then dried over magnesium sulfate, filtered, and concentrated in vacuo to yield methyl (6-cyclohexyl-3-pyridine)acetate.

When ethanol, n-propanol, and n-butanol are used in place of methanol in the above example, there are obtained the corresponding ethyl, n-propyl, and n-butyl acetates.

When the pyridine acetic acid compounds obtained from Examples 6 and 8 are used in place of (6-cyclohexyl-3-pyridine)acetic acid in the above example, there are obtained the corresponding methyl esters.

What is claimed is:

1. A compound of the formula

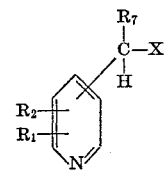

wherein $R_7$ is selected from the group consisting of hydrogen and lower alkyl; $R_1$ is selected from the group consisting of hydrogen, halogen and lower alkyl; $R_2$ is selected from the group consisting of cycloloweralkyl, cycloloweralkenyl and substituted cycloalkyl wherein said substituent is selected from the group consisting of hydroxy, lower alkoxy and benzyloxy; and X is selected from the group consisting of —COOH; —CH$_2$COOH; —COOR$_3$,

—CH$_2$COOR$_3$;

wherein $R_3$ is selected from the group consisting of lower alkyl, cyclo lower alkyl, phenyl, lower alkanoylaminophenyl, carboxyphenyl, carboxamidophenyl, lower alkoxy lower alkyl, poly lower alkoxy lower alkyl, poly hydroxy lower alkyl and di(lower alkyl)amino lower alkyl;

—CONH$_2$; —CH$_2$—CONH$_2$;

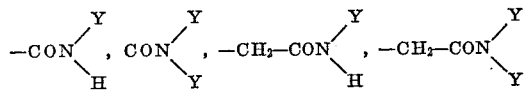

wherein Y is selected from the group consisting of lower alkyl, hydroxy lower alkyl, poly hydroxy lower alkyl, phenyl lower alkyl, phenyl, lower alkoxyphenyl, halogenophenyl, trifluoromethylphenyl, cyclohexyl, carboxymethyl, 1-carboxyl-3-carbamyl-propyl, N-dilower alkyl carboxamidomethyl, N,N-dilower alkylamino lower alkyl, N-lower alkyl pyrrolidyl, N-lower alkyl pyrrolidyl lower alkyl, and Y forms a hetetrocyclic group with the nitrogen when Y is selected from the group consisting of

—CH$_2$—CH$_2$—O—CH$_2$—CH$_2$,

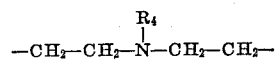

wherein $R_4$ is lower alkyl,

—CH$_2$—CH$_2$—NH—CH$_2$—CH$_2$—,

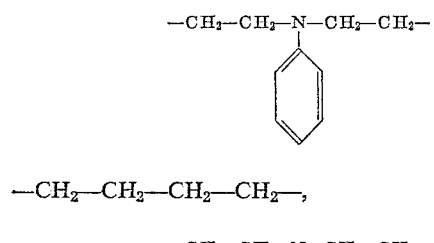

—CH$_2$—CH$_2$—CH$_2$—CH$_2$—,

—CH$_2$—CH$_2$—N—CH$_2$—CH$_2$—
         |
         CH$_2$—CH$_2$OH

—CH$_2$—CH$_2$—CH$_2$—CH$_2$—CH$_2$; —CH$_2$OH;
—CH$_2$—CH$_2$OH; —CH$_2$OR$_5$, —CH$_2$—CH$_2$OR$_5$, wherein R$_5$ is a lower alkyl; —CHO; —CH$_2$—CHO; —CH(OR$_6$)$_2$, —CH$_2$—CH(OR$_6$)$_2$, wherein R$_6$ is a lower alkyl; and a pharmaceutically acceptable non-toxic salt thereof.

2. A compound of claim 1 wherein R$_2$ is selected from the group consisting of cyclohexyl and substituted cyclohexyl, wherein said substituent is selected from the group consisting of hydroxy, benzyloxy, and lower alkoxy; when the acid side-chain is on a position selected from the 2- and 4-position of the pyridine moiety and R$_1$ is alkyl, R$_1$ is then on a position selected from the 3- and 5-position of the pyridine moiety; when the acid side-chain is on the 2-position of the pyridine moiety and the cyclohexyl group is on the 5-position of the pyridine moiety, R$_1$ is on the 3-position of the pyridine moiety; when the acid side-chain is on the 3-position of the pyridine moiety, R$_1$ is on the 5-position.

3. A compound of claim 2 wherein X is COOH.

4. A compound of the formula:

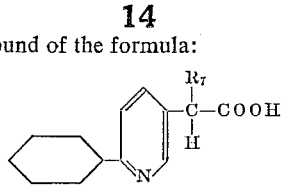

wherein R$_7$ is selected from the group consisting of hydrogen and lower alkyl.

5. A compound of the formula:

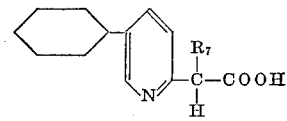

wherein R$_7$ is selected from the group consisting of hydrogen and lower alkyl.

6. (5-cyclohexyl-2-pyridine)acetic acid.
7. (6-cyclohexyl-3-pyridine)acetic acid.
8. (5-cyclohexyl-3-pyridine)acetic acid.
9. (6-cyclohexyl-2-pyridine)acetic acid.
10. (6-cyclohexyl-4-pyridine)acetic acid.
11. (4-cyclohexyl-2-pyridine)acetic acid.

References Cited
UNITED STATES PATENTS
3,069,427  12/1962  Cislak.
3,197,473  7/1965  Klosa.

JOHN D. RANDOLPH, *Primary Examiner.*
A. ROTMAN, *Assistant Examiner.*